US012352083B2

(12) United States Patent
Sendin Martin

(10) Patent No.: US 12,352,083 B2
(45) Date of Patent: Jul. 8, 2025

(54) SAFETY DEVICE

(71) Applicant: OJMAR, S.A., Elgoibar (ES)

(72) Inventor: Ricardo Sendin Martin, Elgoibar (ES)

(73) Assignee: OJMAR, S.A., Elgoibar (ES)

( * ) Notice: Subject to any disclaimer, the term of this patent is extended or adjusted under 35 U.S.C. 154(b) by 147 days.

(21) Appl. No.: 18/220,430

(22) Filed: Jul. 11, 2023

(65) Prior Publication Data

US 2024/0018801 A1 Jan. 18, 2024

(30) Foreign Application Priority Data

Jul. 12, 2022 (ES) .................................. 202231173

(51) Int. Cl.
*E05B 9/08* (2006.01)
*E05B 37/00* (2006.01)

(52) U.S. Cl.
CPC .......... *E05B 9/084* (2013.01); *E05B 37/0031* (2013.01)

(58) Field of Classification Search
CPC ...... E05B 55/06; E05B 13/004; E05B 13/005; E05B 9/00; E05B 9/084; E05B 13/108; E05B 17/0054; E05B 17/0058; E05B 37/0031; Y10T 70/7141; Y10T 70/7147; Y10T 70/7915; Y10T 70/7424
USPC ..... 70/416, 422, 224, 370, 284, 285, 21–22; 292/347, 349
See application file for complete search history.

(56) References Cited

U.S. PATENT DOCUMENTS

| | | | | |
|---|---|---|---|---|
| 4,007,956 A * | 2/1977 | Harris | E05B 13/001 | 292/357 |
| 4,773,240 A * | 9/1988 | Foshee | E05B 17/0058 | 70/222 |
| 5,010,755 A * | 4/1991 | Best | E05B 17/0058 | 70/222 |
| 6,508,089 B1 | 1/2003 | Tsai | | |
| 7,444,844 B1 * | 11/2008 | Lee | E05B 37/02 | 70/284 |
| 9,222,283 B1 * | 12/2015 | Zhang | E05B 37/0034 | |
| 10,513,871 B2 * | 12/2019 | Wang | E05B 1/003 | |

FOREIGN PATENT DOCUMENTS

| | | | | |
|---|---|---|---|---|
| DE | 4413514 C1 * | 4/1995 | E05B 17/0058 |
| DE | 202021105159 U1 | 9/2021 | |
| GB | 2528327 A * | 1/2016 | E05B 17/0058 |
| KR | 101048110 B1 | 7/2011 | |
| WO | WO-0102678 A1 * | 1/2001 | E05B 13/101 |

* cited by examiner

*Primary Examiner* — Suzanne L Barrett
(74) *Attorney, Agent, or Firm* — The Webb Law Firm

(57) ABSTRACT

The present invention relates to a safety device for locks including a casing with a system for entering an opening code, a cylinder for activating the lock, and a dial, fixed to the casing with capacity of rotation, and firmly attached to a tab which blocks opening based on the position in which it is located by means of a connecting part and the cylinder, the tab being firmly fixed to the cylinder. The dial includes a drive bushing firmly fixed to the cylinder by means of a connecting part, and a cover bushing including a flange, for fixing to the inside of the casing, and a gripping area projecting from the casing to activate the tab, wherein the cover bushing is fixed to the drive bushing by pressure.

2 Claims, 5 Drawing Sheets

SAFETY DEVICE

CROSS-REFERENCE TO RELATED APPLICATION

This application claims priority to Spanish Utility Model Application No. U202231173 filed Jul. 12, 2022, the disclosure of which is hereby incorporated by reference in its entirety.

BACKGROUND OF THE INVENTION

Field of the Invention

The present invention relates to a safety device for protecting a lock against acts of vandalism of tampering, regardless of where it is installed.

It has a particular application in the industrial field relating to locks.

Description of Related Art

In the current state of the art, there are many different types of locks which are intended to be used in lockers, cabinets and the like, and have a very basic configuration, so they are easily accessible which creates a need to protect these elements in a safer way and to provide them with safety systems that prevent acts of vandalism of tampering.

One of these common locks is the one that has, on one hand, a system for entering an opening code by means of a combination, an electronic card, or the like, and a system for opening the lock, made up of a dial, or knob, firmly attached to a tab that blocks opening by interfering with an element of the structure of the locker. In this way, once the key or correct code for opening has been introduced, upon rotating the dial, blocking is released and the tab, which rotates to overcome the interference that prevented opening, is activated.

However, one of the problems with this type of locks is that if, in an act of vandalism of tampering, an excessive force is applied to the dial in order to rotate it, forcing the lock so as to open it without authorization, the blocking responsible for preventing the dial from actuating the tab breaks, so that the tab is released and can be rotated.

SUMMARY OF THE INVENTION

To achieve the objectives and prevent the aforementioned drawbacks, the present invention describes a safety device for locks comprising a casing, a cylinder, and a dial.

The casing incorporates a system for entering an opening code.

The cylinder is in turn responsible for activating the lock.

The dial is fixed to the cylinder and, with capacity of rotation, to the casing through the inner area, the area to be protected, and it cannot be extracted from the outer area accessible to the user for handling the lock. Furthermore, the dial is firmly attached to a tab by means of a connecting part and the cylinder. The tab is responsible for blocking the opening of the lock based on the position in which it is located, and by means of the rotation of the dial, it changes position in order to allow opening the lock.

Furthermore, the dial comprises a drive bushing and a cover bushing.

The drive bushing is firmly fixed to the cylinder by means of a connecting part, whereas the cover bushing comprises a flange, for fixing to the inside of the casing, and a gripping area, projecting from the casing, accessible to a user to activate the tab once access has been authorized.

The main feature between the cover bushing and the drive bushing is that the coupling is performed by pressure, so the fixing is by means of friction. This means that the drive bushing will only move if the user has obtained authorization, either by means of entering the correct code or using the suitable key. However, without this authorization, if the user applies an excessive force to force the lock, the cover bushing will simply slide over the drive bushing, without this effort being transmitted to the tab.

The configuration of the drive bushing consists of a ring which incorporates an extension intended to be fitted into a recess of the connecting part such that the rotation of the two parts is simultaneous. The extension can have any configuration such that, once it is coupled in the connecting part, the fixing implies a joint rotation of the two parts. To that end, it can simply consist of a prolongation from a segment of the cylindrical wall of the ring of the drive bushing and a complementary recess in the connecting part.

In turn, the cover bushing has a hollow cylindrical configuration, wherein the gripping area has discontinuities to facilitate slip-free gripping when trying to rotate it with the fingers, whereas the flange is an edge on one of the bases with a larger diameter and a specific height. In this way, upon introducing the cover bushing into the casing of the lock through a circular opening from the inner area, the gripping area will move to the outer area with access for the user, whereas the flange will abut with and be arranged in the inner area, preventing the part from being able to be removed.

BRIEF DESCRIPTION OF THE FIGURES

The terms Fig., Figs., Figure, and Figures are used interchangeably in the specification to refer to the corresponding figures in the drawings.

To complete the description of the invention, and for the purpose of helping to make the features thereof more readily understandable, according to a preferred exemplary embodiment thereof, a set of drawings is included wherein, by way of illustration and not limitation, the following figures have been represented.

Figure 1:
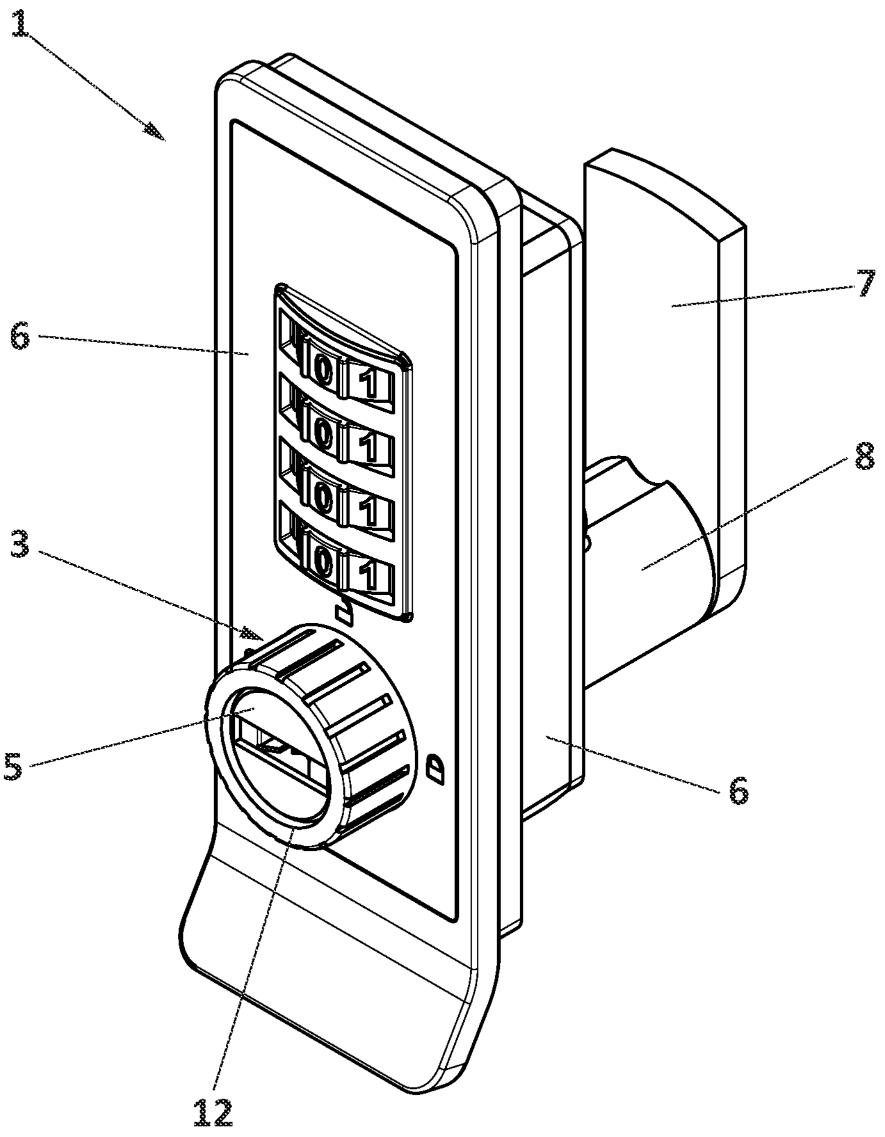
FIG. 1 depicts a top front perspective view of the safety device of the invention installed in a lock.

A list of the references used in the figures is provided below:

1. Lock.
2. Drive bushing.
3. Cover bushing.
4. Connecting part.
5. Cylinder.
6. Casing.
7. Tab.
8. Shaft.
9. Extension.
10. Ring.
11. Flange.

12. Gripping area.
13. Recess.
14. Stop.
15. Projections.

DESCRIPTION OF THE INVENTION

The object of the present description consists of a safety device the configuration and design of which protect the lock (1) where it is installed against acts of vandalism of tampering.

To prevent the aforementioned problems, the dial of the conventional lock described above has been modified, being configured by two parts: a drive bushing (2) and a cover bushing (3) which is what the user will see and use like a knob to open the lock (1) upon rotating it.

The drive bushing (2) is a part which is coupled to the cylinder (5) of the lock (1) by means of a connecting part (4) and which is also attached to the tab (7) for blocking the lock (1). The tab (7) blocks the opening of the lock by interfering with the structure of the cabinet or locker to be closed.

Once the correct opening code has been entered in the lock (1), the dial is activated by means of a rotation of the cover bushing (3) and the drive bushing (2) transfers the rotational movement to the tab (7) which, when rotated, releases the interference and allows opening the door where the lock (1) is located.

The cover bushing (3) is a part which is installed by pressure on the drive bushing (2). In this way, upon rotating the cover bushing (3), the drive bushing (2) is also rotated.

In the event of an attempt to tamper with the lock (1), exerting an excessive force on the cover bushing (3) to rotate it will cause the cover bushing to slide over the drive bushing (2), protecting the lock (1) and preventing the unauthorized opening thereof.

The device, as well as its operation, will be described in more detail below.

FIG. 1 depicts a lock (1) viewed from the front or external area of the space to be closed, with the safety device of the invention incorporated. The lock (1) can be opened by means of a combination or also by means of a key which, once access is authorized, allows rotating the cover bushing (3) in order to rotate the blocking tab (7), to release the interference, and to enable opening the door where the lock is located.

Figure 2:
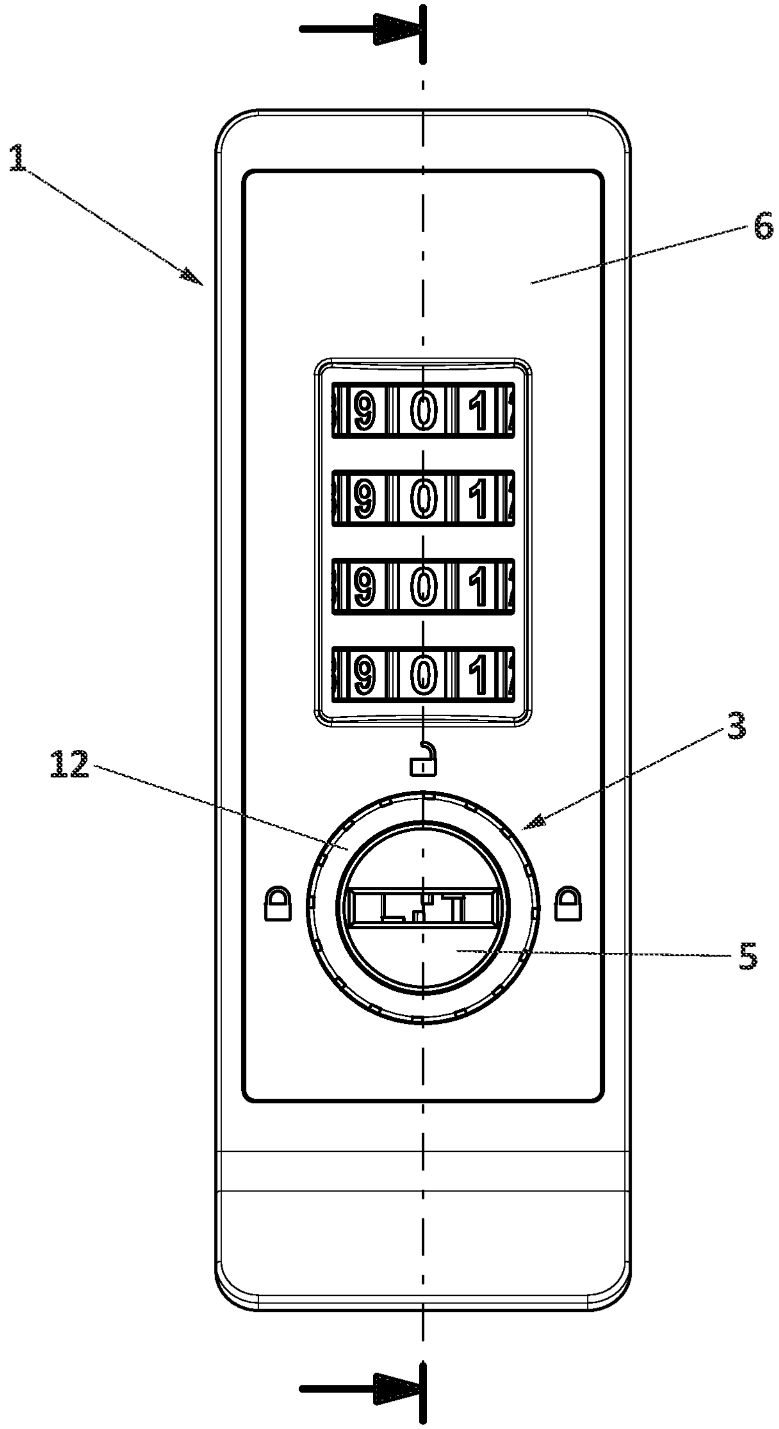
FIG. 2 depicts a front view of the safety device of the invention installed in a lock.

FIG. 2 depicts a front view of the lock of FIG. 1 in which a section line is shown.

Figure 3:
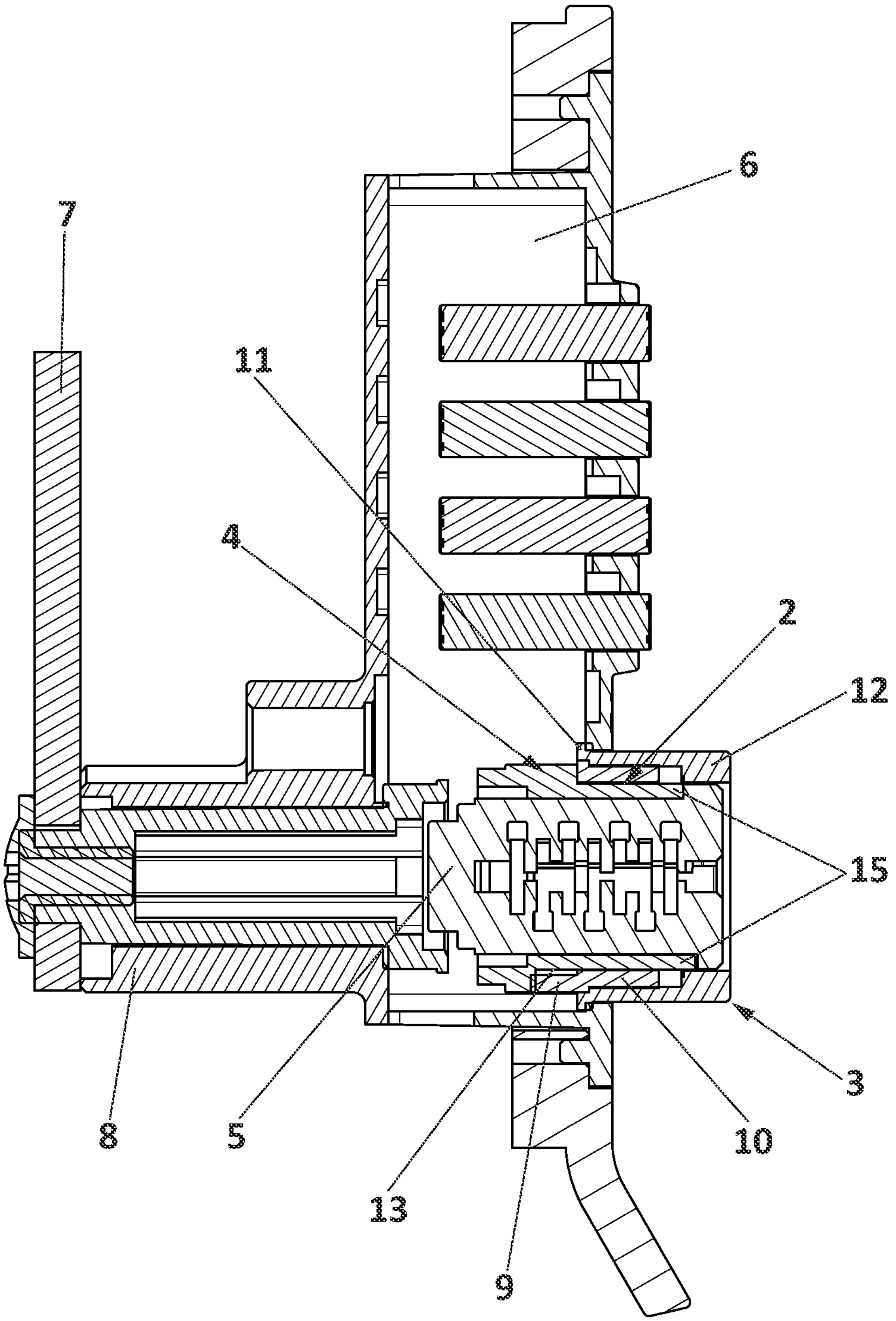
FIG. 3 depicts a side view according to the section marked in FIG. 2.

FIG. 3 depicts a sectional side view of the lock depicted in FIG. 2 according to the section line.

It can be seen in this figure how all the main components of the lock are coupled with the protective device of the invention. In that sense, the tab (7) is firmly attached to a hollow shaft (8) where an element for attaching to the cylinder (5) of the lock (1) is housed. It can also be seen that the cover bushing (3) incorporates a flange (11) and a gripping area (12). The flange (11) abuts with the casing (6), preventing the possibility of removing the dial from the outside by pulling on the gripping area (12) of the cover bushing (3) emerging outwardly.

It can also be seen in FIG. 3 how the cover bushing (3) is coupled to the drive bushing (2) simply by pressure, without any retaining element. In turn, the drive bushing (2) is coupled to a connecting part (4) firmly coupled to the cylinder (5). In this way, the cover bushing (3) is directly connected to the tab (7) such that, with the tab (7) having freedom of movement, a rotation of the cover bushing (3) means a rotation of the tab (7).

Figure 4:
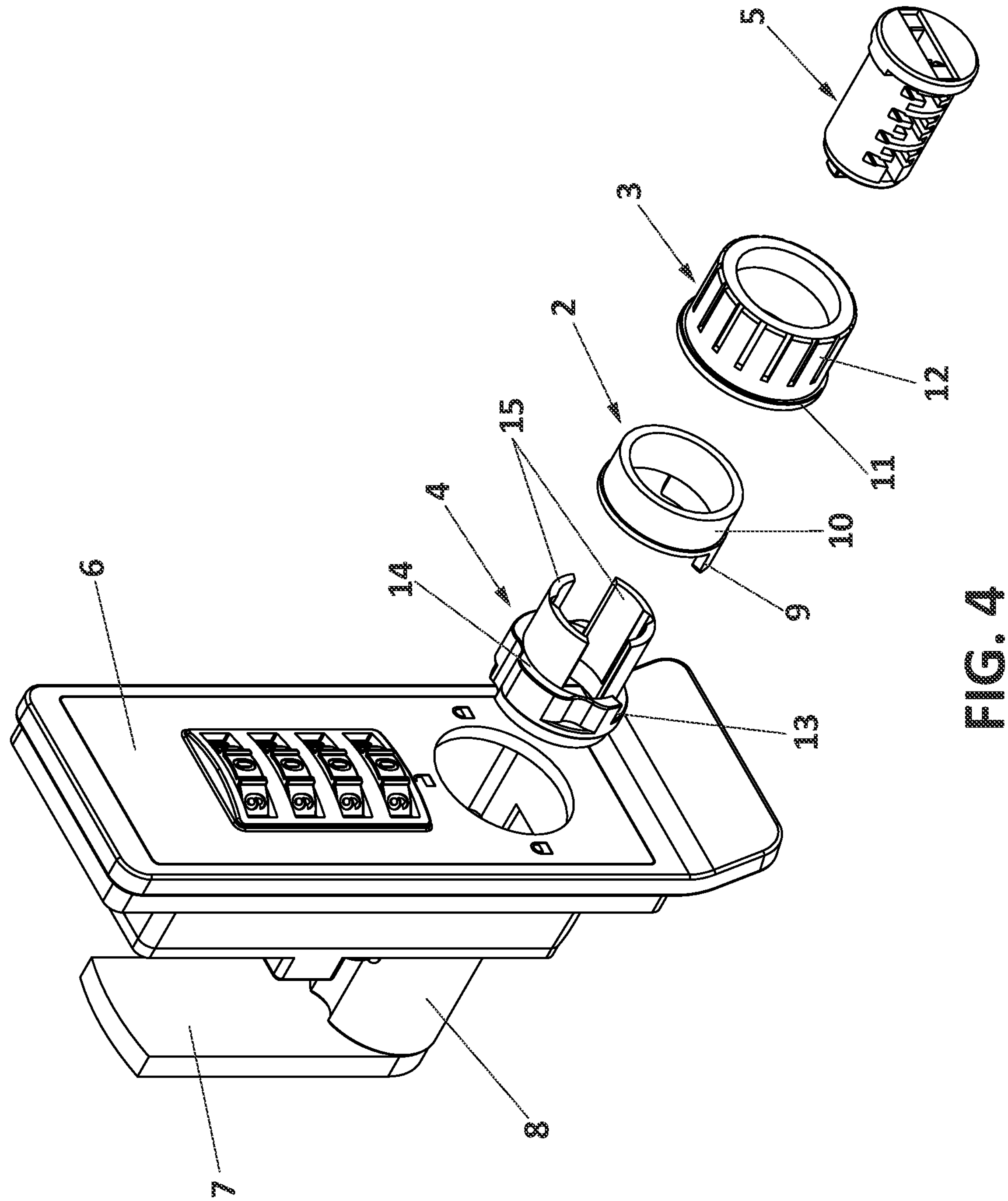
FIG. 4 depicts an exploded perspective view of the main elements forming the lock with the safety device of the invention.

FIG. 4 depicts an exploded view of the lock (1) in which the position of the components depicted in FIG. 3 before being coupled can be seen.

In particular, it can be seen that the drive bushing (2) is formed by a ring (10) which incorporates an extension (9).

On the other hand, the connecting part (4) incorporates projections (15), a stop (14), and a recess (13).

To couple the drive bushing (2) in the connecting part (4), the projections (15) are inserted into the ring (10) until contacting the stop (14). The drive bushing (2) must be positioned radially so that the extension (9) fits into the recess (13) of the connecting part (4), such that the rotation of one part can be transmitted to another part.

Figure 5A:
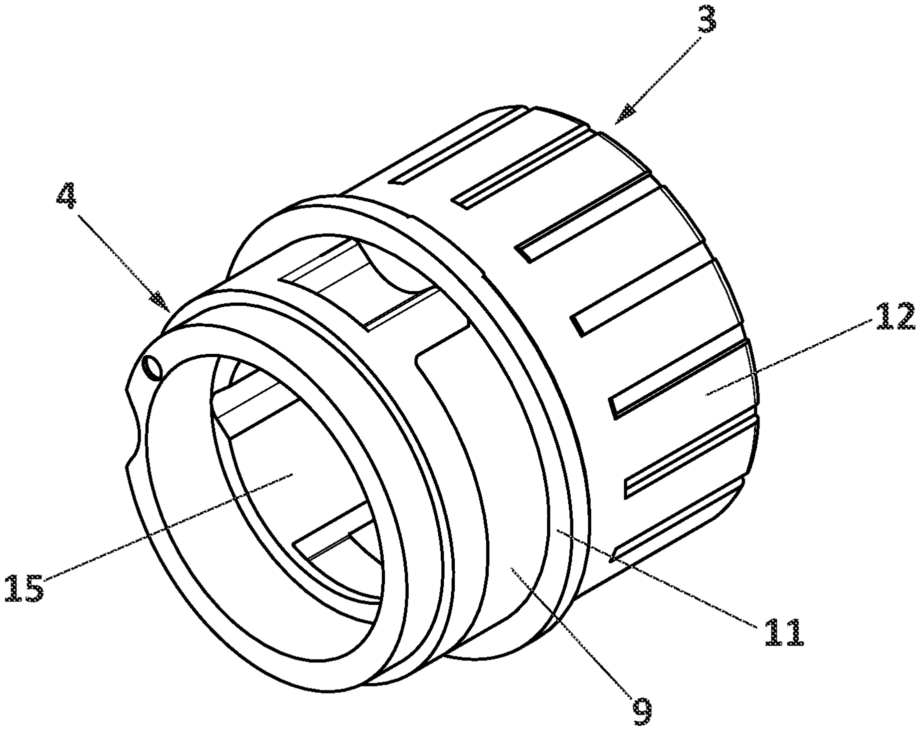
FIGS. 5A and 5B depict rear and front perspective views, respectively, of the dial assembled in a connecting part.
Figure 5B:
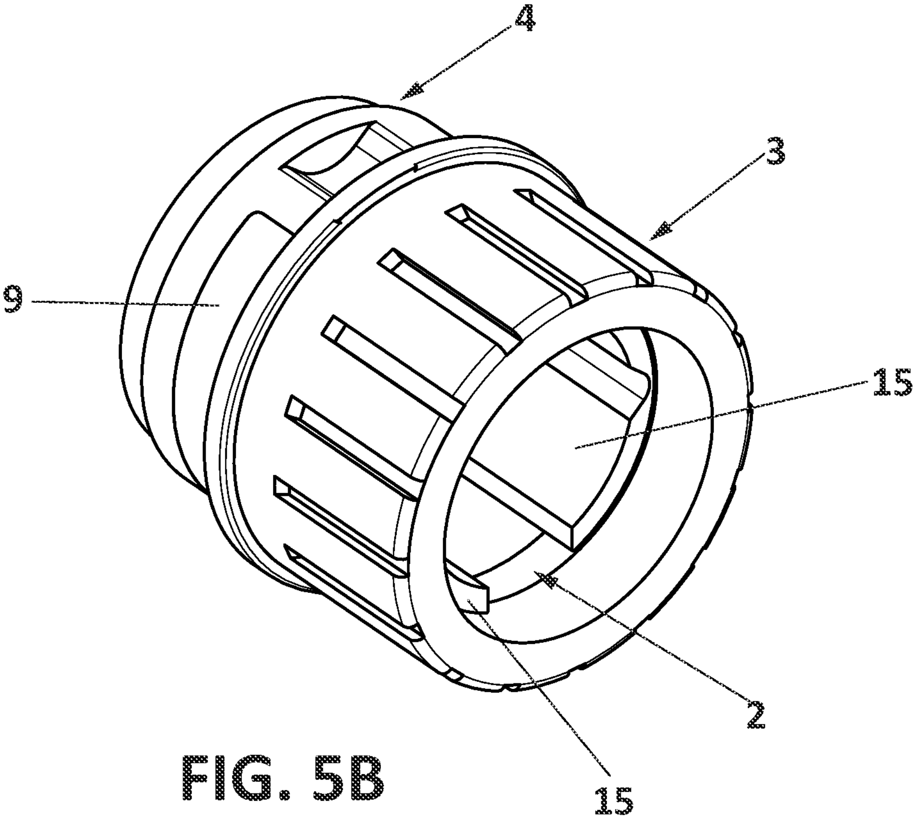

The attachment of these two parts (2, 4) can be seen more clearly in FIGS. 5A and 5B.

Lastly, it must be taken into account that the present invention must not be limited by the embodiment described herein. Other configurations may be carried out by those skilled in the art based on the present description. Accordingly, the scope of the invention is defined by the following claims.

The invention claimed is:

1. A safety device for locks, comprising a casing which incorporates a system for entering an opening code, a cylinder for activating the lock, and a dial, fixed to the casing with capacity of rotation, and attached to a tab by means of friction which blocks opening based on the position in which the tab is located by means of a connecting part and the cylinder, the tab being firmly fixed to the cylinder, wherein the dial of the safety device comprises:

a drive bushing firmly fixed to the cylinder by means of a connecting part, and a cover bushing comprising a flange, for fixing to the inside of the casing, and a gripping area projecting from the casing to activate the tab, wherein the cover bushing is fixed to the drive bushing by pressure, wherein the drive bushing will only move if the user has obtained authorization, either by means of entering the correct code or using a suitable key, and wherein the drive bushing is configured by means of a ring which incorporates an extension intended to be fitted into a recess of the connecting part such that the rotation of the two parts is simultaneous.

2. The safety device of claim 1 wherein in that the cover bushing has a hollow cylindrical configuration, wherein the gripping area has discontinuities to facilitate gripping and the flange is an edge on a base of the cover bushing with a larger diameter and a specific height.

* * * * *